Oct. 27, 1964   P. J. WEAVER   3,154,486
CHECK VALVE AND FILTER
Filed July 16, 1962
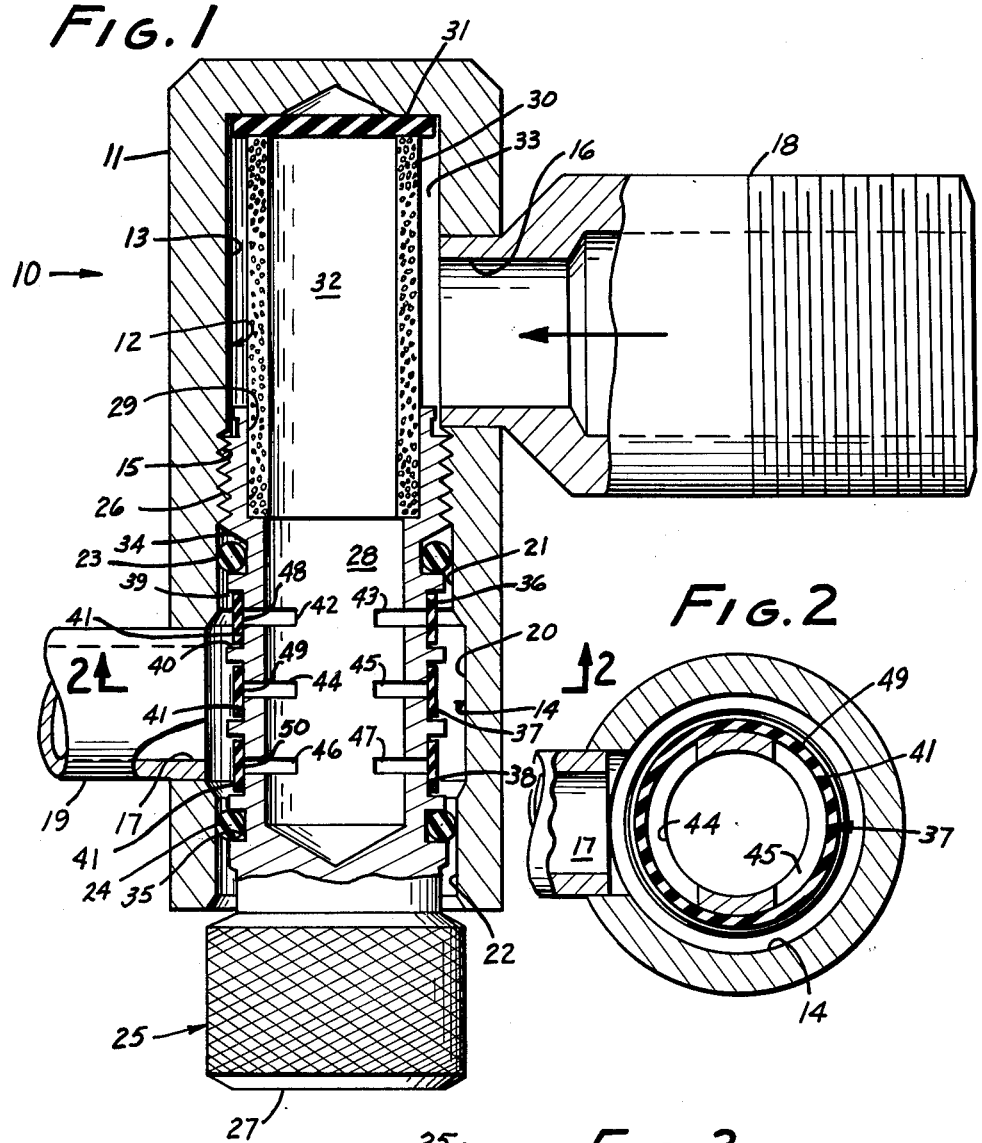
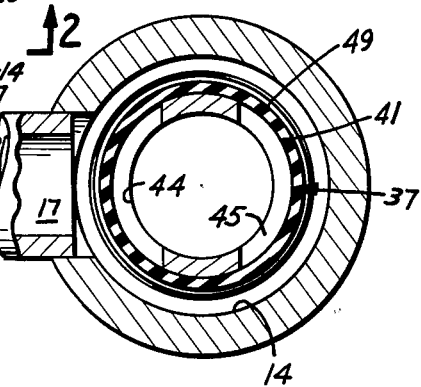
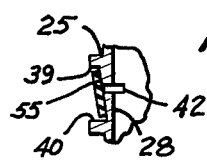
INVENTOR.
PAUL J. WEAVER
BY Angus & Mon
ATTORNEYS.

Patented Oct. 27, 1964

1

**3,154,486
CHECK VALVE AND FILTER**
Paul J. Weaver, Pasadena, Calif., assignor to Graning Enameling Company, El Monte, Calif., a corporation of California
Filed July 16, 1962, Ser. No. 209,844
3 Claims. (Cl. 210—136)

This invention relates to a check valve for limiting flow through a conduit to a single direction, and to a filter especially suited for use therewith.

Particularly in water systems which utilize mixing valves, wherein particulate matter carried by the water stream may interfere with valve action, and even scour and damage parts, it is necessary to assure a clean water stream to the valve. Also, in connection with many applications of fluid flow but also most particularly with mixing valves wherein two streams such as one of hot and one of cold water are mixed, it is desirable to restrict the mixing action to the effluent from the faucet, and to prevent cross flow through the faucet, such as by dilution of the hot water supply by cold water or vice versa.

While filters and check valves are known in the art, which could restrict the flow direction and clean the stream, none of them is sufficiently inexpensive to manufacture and simple to service as to be fully satisfactory for home plumbing installations. It is an object of this invention to supply a simple and inexpensive check valve and filter capable of accomplishing the aforesaid desirable objectives.

A check valve according to this invention comprises a housing having an internal chamber. A member having an external surface thereon is disposed in the chamber, and this member has a perforation through the surface. An inlet port and an outlet port pass through the housing and fluidly communicate with opposite ends of the perforation. A flexible elastic flow control member overlays the perforation, thereby restricting fluid flow through the perforation to one direction only.

According to a preferred but optional feature of this invention, the insert is tubular and the surface is a surface of revolution on it. The flow control member comprises an elastic band which overlays the perforation, and opens the check valve when differential pressure is exerted beneath the band, and closes it when the differential pressure is reversed.

According to still another preferred but optional feature of this invention, a tubular sintered metal filter is disposed in fluid communication with the perforation and stands between the perforation and the inlet port so as to pass only filtered fluid to the perforation, thereby preventing grit and the like from interfering with the reliable operation of the flexible flow control member.

The above and other features of this invention will be fully appreciated from the following detailed description and the accompanying drawings in which:

FIG. 1 is a side elevation, partly in cutaway cross-sections showing the presently preferred embodiment of the invention;

FIG. 2 is a cross-section taken at line 2—2 of FIG. 1; and

FIG. 3 is a fragmentary cross-section of an optional feature of the invention.

The presently preferred embodiment of check valve-filter device 10 includes a housing 11 having a central chamber 12 therein. The chamber is divided into two sections: a filter chamber 13 and a check valve chamber 14. Internal threads 15 stand between the two sections. An inlet port 16 and an outlet port 17 are axially spaced apart from each other, and pass through the wall of the housing into chambers 13 and 14 respectively.

2

Inlet and outlet fittings 18, 19 are respectively connected to the inlet and outlet ports.

Filter chamber 13 is generally cylindrical. The check valve chamber includes a central groove 20 adjacent to the outlet port, and a pair of smooth cylindrical O-rings engaging surfaces 21, 22, one on each side of the groove. O-rings 23, 24 engage surfaces 21, 22 respectively.

An insert 25 (sometimes called an inner member) is placed inside the chamber. It includes external threads 26 which engage threads 15 to hold the insert in place. A knurled knob 27 on the external end of the insert enables it to be grasped and turned.

The insert includes a central bore 28 with a counter bore 29 and its upper end in FIG. 1. The counter bore serves to receive a cylindrical tubular filter element 30, which element is preferably but not necessarily made of a sintered metal such as bronze. Any other suitable filtering material may be used instead, but it has been found for household applications that sintered bronze is very effective. An end seal pad 31 is placed in the closed end of the chamber. One end of the tubular filter element bears against it to seal end of the internal passage 32 of the filter element.

It will be noted that there is an annular spacing 33 between the outer wall of the tubular filter element and the internal wall of the filter chamber, thereby permitting fluid to enter the internal passage from all sides of the tubular filter element. Tightening the insert down by means of the threads will effectively hold the filter in the position illustrated. Internal passage 32 is in fluid communication with the central bore of the insert so that filtered liquid is supplied to the bore of the insert.

The external surface of the insert is formed with a pair of O-ring grooves 34, 35 which receive O-rings 23, 24 respectively. At least one, but preferably about three grooves 36, 37, 38 are formed on the insert. These grooves are bounded by axially spaced-apart sidewalls 39, 40 shown in connection with groove 36. Each of grooves 37, 38 has the same construction as groove 36. Therefore only groove 36 will be described in full detail.

Groove 36, and each of the grooves, is bounded on its bottom by surface 41 of revolution which in the preferred embodiment is a cylinder.

Six perforations 42, 43, 44, 45, 46, 47 are cut across surfaces 41 to form perforations, which perforations are in fluid communication with the inlet and outlet ports.

A flexible flow control member 48, 49, 50 is disposed in each of grooves 36, 37, 38. These members are preferably flat rubber bands of lesser width than the axial spacing between sidewalls 39 and 40 to provide a fluid passage at the side of each groove when the flow control member is lifted off the respective perforations.

FIG. 3 shows an alternate shape of bottom surface 55, which can be used instead of surfaces 41. This surface is the frustum of a cone having a conical angle of about 30°. The flow control member assumes this same shape when it grips the surface. The advantage of this arrangement is that the flow control member tends to rise at its upper edge in FIG. 3, and the major proportion of the flow is past this edge. In FIG. 1, the flow control members occasionally may "balloon" out and hang up on an adjacent shoulder, which is avoided by the arrangement of FIG. 3. The bottom surface of FIG. 3 can be used instead of all or any number of bottom surfaces 41 in FIG. 1.

It will be seen from the foregoing that the assembly of this device is simple. The end seal is dropped in, the filter element is placed in the counter bore, the O-rings and flexible fluid control members are put in their grooves, and then the insert is threaded into the chamber. When the insert is tightened down, the device is ready for operation. Cleaning the filter and replacing of the O-rings or flow control members is as simple as simply unscrewing the insert, either washing off or replacing the filter, and replacing O-rings and flow control members.

In operation, when the differential pressure is at least slightly greater at the inlet port than at the outlet port, water flows into the inlet port, through the wall of the tubular filter element into bore 28, and through the perforations. A sufficient differential pressure will overcome the elastic forces exerted by the flow control members and will move the bands off the perforations so that water can flow between surfaces 41 and the respective flow control members, and between the sidewalls 39, 40 and the respective flow control members, and thence out through the outlet port. Should there be a reverse differential pressure, it will simply collapse the flow control members against the perforations and close them, thereby preventing reverse flow.

It will be seen that this device is simple and inexpensive to manufacture, and assemble. It is equally simple to disassemble and service. The device is reliable in operation and achieves the desired objectives of preventing back flow and of mixing between the conduits, and also of keeping the fluid flow sufficiently clean that elements such as the bands, which are sensitive to grit in the stream, can operate unimpeded.

The invention is not to be limited by the embodiment shown in the drawings and described in the description which is given by way of example and not of limitation but only in accordance with the scope of the appending claims.

I claim:

1. A combination check valve and filter assembly comprising: a housing having an interior chamber, an inlet port, an outlet port, and a chamber port, all of said ports extending through the housing and opening into the chamber; an itnernal thread disposed on the interior wall of said chamber at a medial point thereof so as to divide the chamber into a filter chamber and a check valve chamber; an insert having a head, and a central bore and counterbore, said bores extending into the insert from the end thereof remote from the head; an external thread on said insert adapted to engage the internal thread of the housing, the bores opening into the filter chamber and the head projecting through the chamber port and beyond the housing; a tubular porous filter element seated in the counterbore and extending into the filter chamber; a flexible pad in fluid-sealing contact between the chamber wall and the end of the filter element remote from the insert, the inlet port opening into the filter chamber thereby to discharge fluid toward the outer surface of the filter element; sealing means extending between and sealing between the insert and the chamber wall on both sides of the outlet port, thereby sealing between the filter chamber and the check valve chamber, and closing the chamber port; the insert bearing a surface of revolution on the outside thereof, which lies in the check valve chamber, and a perforation through the insert in fluid communication between the bore and the said surface of revolution, thereby to provide a passage between the inlet and outlet ports; and an elastic flow control member overlaying the perforation and a portion of the surface of revolution completely surrounding the perforation, said flow control member being stretched away from said portion by a sufficiently greater inlet than outlet pressure, and pressed against the portion by a reverse differential pressure, thereby to comprise a unidirectional flow check valve.

2. A combination according to claim 1 in which the flow control member is an elastic band peripherally surrounding the insert, 3. A combination according to claim 1 in which the filter element is a sintered-metal cylinder.

References Cited in the file of this patent

UNITED STATES PATENTS

| 1,854,518 | Little | Apr. 19, 1932 |
| 2,084,294 | Cooper | June 15, 1937 |
| 2,548,374 | Janson | Apr. 10, 1951 |
| 2,715,980 | Frick | Aug. 23, 1955 |
| 2,922,432 | Huntington | Jan. 26, 1960 |
| 3,073,246 | Saunders | Jan. 15, 1963 |

FOREIGN PATENTS

| 502,017 | Belgium | Apr. 14, 1951 |